Oct. 9, 1945. M. WATTER 2,386,729
SLEEVE BOLT
Filed Dec. 8, 1944

INVENTOR
Michael Watter
BY John P. Tarbox
ATTORNEY

Patented Oct. 9, 1945

2,386,729

UNITED STATES PATENT OFFICE 2,386,729

SLEEVE BOLT

Michael Watter, Philadelphia, Pa., assignor to Edward G. Budd Manufacturing Company, Philadelphia, Pa., a corporation of Pennsylvania Application December 8, 1944, Serial No. 567,137

3 Claims. (Cl. 85—4)

This invention relates to bolting means, particularly to a sleeve type bolting means, and has for an object the provision of improvements in this art.

One of the particular objects of the invention is to provide a bolt device which can be installed in locations where the space behind the parts to be fastened is small and screened from view.

Another object is to provide a bolt device which can be locked or safetied wholly on the accessible side.

Another object is to provide a bolt device which presents a smooth wall within its opening and smooth non-turning head surfaces at the ends of the opening.

Another object is to provide a bolt device having parts which readily assume their proper final position from practically any position of initial introduction.

The above and other objects of the invention will be apparent from the following description of an exemplary embodiment, reference being made to the accompanying drawing, wherein.

Figure 1:
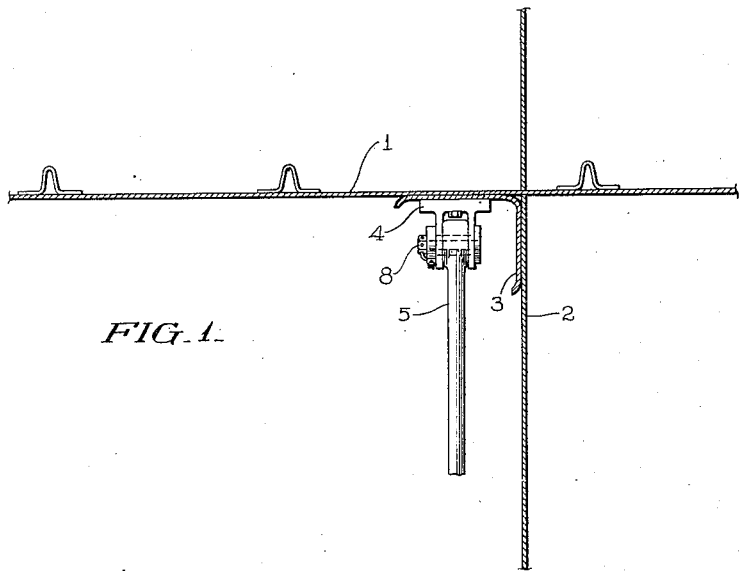
Fig. 1 is a plan section view of a structural assembly in which the bolt device is used.
Figure 2:
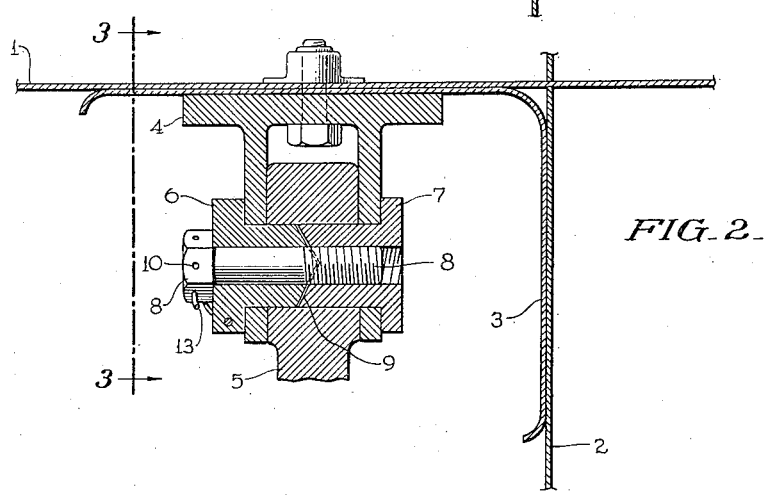
Fig. 2 is an enlarged local view.
Figure 3:
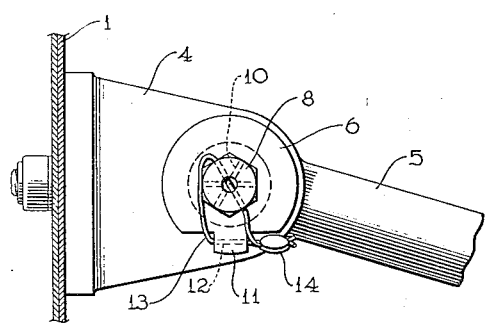
Fig. 3 is an end view.

As representative of one of many constructions where the device may be usefully employed, there is shown a spar 1, a rib 2, an angle-section member 3 in their joining corner, and a bracket 4 to which a fitting 5 is to be attached. The bracket and fitting may, for example, form one of the anchorages for an airplane engine mount. It will be seen that the space between the bracket and the angle-section member is very small and hidden, making access for connecting and safetying very difficult if the usual bolt and nut attaching means are used.

According to the present invention the bracket and fitting, which are provided with aligned bolt holes, are connected by a sleeve bolt device comprising a non-threaded headed sleeve 6, a threaded headed sleeve 7, and a bolt 8 which is threaded near the end on the part adapted to engage the threaded sleeve 7. The bushings are provided with V-shaped ends 9 which nest together when the parts are drawn up by the bolt. There may be a number of V-shaped projections and recesses if desired. If only one pair is used it is easy to provide sleeves of the proper length on the job by cutting off longer sleeves. Also the larger projections provide a long zone of interengagement in which the parts are drawn together.

In assembly, the threaded sleeve 7 is inserted in the hole from the less accessible side of the parts. It is short and can be introduced into very small places. It can be made relatively shorter than shown, if necessary. The unthreaded bushing 6 is inserted from the more accessible side. Then the bolt 8 is inserted and turned up, the head of either one of the bushings being held if necessary to start or tighten the bolt. A space, preferably small, may be left between the adjacent ends of the bushings when the parts are drawn up.

The bolt head is provided with holes 10, and a lug 11 on the head of the sleeve 8 is provided with a hole 12; and through these holes 10 and 12 there is passed a safetying element such as wire 13 after the parts are tight. The ends of the wire may be secured by twisting them together or by a seal 14 or both.

It is thus seen that the invention provides a very simple, convenient and effective bolting and safetying device which is particularly desirable for partly inaccessible locations.

While one embodiment of the invention has been described for purposes of illustration it is to be understood that there may be various embodiments within the limits of the prior art and the scope of the sub-joined claims.

What is claimed is:

1. A sleeve bolt device comprising in combination, two aligned oppositely headed sleeves provided on their adjacent ends with circumferentially inclined interfitting elements, one of the sleeves being threaded and the other unthreaded internally and a headed bolt securing the sleeves together, the bolt passing freely through the unthreaded sleeve and being threaded in the threaded sleeve.

2. A sleeve bolt device comprising in combination, two oppositely headed sleeves having mating elements on their adjacent ends, a headed bolt threaded in one of the sleeves and passing freely through the other sleeve, and means securing the head of the bolt and the head of the unthreaded sleeve together in final position.

3. A sleeve bolt device comprising in combination, two oppositely headed sleeves provided with V-shaped mating elements on their adjacent ends, a headed bolt passing freely through the adjacent sleeve and threaded in the sleeve distant from its head, said bolt head having a plurality of diametral holes therein, and the adjacent sleeve head having a part cut away to form a projection and the projection having a hole therein, and a safetying wire secured in the holes of the bolt head and sleeve head.

MICHAEL WATTER.